(12) United States Patent
Burch et al.

(10) Patent No.: US 8,301,876 B2
(45) Date of Patent: Oct. 30, 2012

(54) TECHNIQUES FOR SECURE NETWORK COMMUNICATION

(75) Inventors: Lloyd Leon Burch, Payson, UT (US); Prakash Umasankar Mukkara, Bangalore (IN); Robert Skousen Stilmar, Payson, UT (US); Douglas Garry Earl, Orem, UT (US)

(73) Assignee: EMC Corporation, Hopkinton, MA (US)

( * ) Notice: Subject to any disclaimer, the term of this patent is extended or adjusted under 35 U.S.C. 154(b) by 831 days.

(21) Appl. No.: 12/121,843

(22) Filed: May 16, 2008

(65) Prior Publication Data

US 2009/0319776 A1    Dec. 24, 2009

(51) Int. Cl.
*H04L 29/06* (2006.01)

(52) U.S. Cl. .............................. 713/155; 726/9; 705/75

(58) Field of Classification Search .................. 713/150, 713/155, 159, 168, 172; 726/2–6, 9, 10; 709/217–219, 223, 225, 227–229; 705/50, 705/64, 77, 78
See application file for complete search history.

(56) References Cited

U.S. PATENT DOCUMENTS

| | | | |
|---|---|---|---|
| 5,602,917 A | | 2/1997 | Mueller |
| 6,154,767 A * | | 11/2000 | Altschuler et al. ............ 709/203 |
| 6,336,095 B1 * | | 1/2002 | Rosen ........................... 705/26.1 |
| 6,502,192 B1 * | | 12/2002 | Nguyen ............................ 726/4 |
| 6,701,438 B1 * | | 3/2004 | Prabandham et al. .......... 726/11 |
| 7,017,049 B2 | | 3/2006 | Hand et al. |
| 7,024,695 B1 * | | 4/2006 | Kumar et al. .................... 726/26 |
| 7,082,466 B1 | | 7/2006 | Steegmans et al. |
| 7,197,568 B2 | | 3/2007 | Bourne et al. |
| 2002/0076044 A1 | | 6/2002 | Pires |
| 2002/0099942 A1 * | | 7/2002 | Gohl ............................. 713/169 |
| 2003/0005118 A1 | | 1/2003 | Williams |
| 2003/0033523 A1 * | | 2/2003 | McNulty et al. ............... 713/168 |
| 2003/0126084 A1 * | | 7/2003 | Drummond et al. ............ 705/43 |
| 2004/0193876 A1 * | | 9/2004 | Donley et al. ................. 713/162 |
| 2005/0108528 A1 * | | 5/2005 | Wanish et al. ................. 713/168 |
| 2007/0011329 A1 * | | 1/2007 | Albert et al. .................. 709/226 |
| 2009/0212105 A1 * | | 8/2009 | Couper et al. ................. 235/379 |
| 2009/0271514 A1 * | | 10/2009 | Thomas et al. ................ 709/224 |
| 2009/0328186 A1 * | | 12/2009 | Pollutro et al. ................. 726/13 |
| 2012/0017089 A1 * | | 1/2012 | Kocher ......................... 713/172 |

* cited by examiner

*Primary Examiner* — Gilberto Barron, Jr.
*Assistant Examiner* — Abdulhakim Nobahar
(74) *Attorney, Agent, or Firm* — Barry N. Young (57) ABSTRACT

Techniques for secure network communication are provided. Credentials for a user along with a transparently generated secret are sent to a resource that the user desires to establish a secure communication session with. After successful authentication of the user, an initial sequence number for a first transaction of the session is set on a client of the user. Thereafter, with each transaction of the session the client supplies a new and unique sequence number to a server of the resource and uses the secret to encode and validate that transaction. The server of the resource does not permit any transaction that includes an invalid or previously used sequence number.

17 Claims, 4 Drawing Sheets

TECHNIQUES FOR SECURE NETWORK COMMUNICATION

BACKGROUND

Increasingly, individuals governments, and enterprises are relying on the Internet to conduct their affairs. The primary mechanism to conduct affairs over the Internet is a World-Wide Web (WWW) browser.

Some browser transactions of users are innocuous requiring little to no security. Yet, many transactions are either sensitive in nature or are types of transactions where the users do not want any record of their actions recorded or tracked. In other words, the users want anonymity and privacy.

One issue with using a browser for a sensitive communication between a user and an Internet server is managing a communication session. Users will conduct many transactions during a typical session with a server and yet they expect to authenticate and login just once for the session to that server. This only makes sense because otherwise, security would be too cumbersome and nearly unusable if a user had to re-authenticate to the server for each transaction of the session. Thus, the user needs to login just once per session and use his/her browser for many different activities that require the user to be authenticated. This is generally achieved by setting a cookie on the user's browser at authentication time and then checking this cookie transparently each time the user accesses a resource that needs to be checked for authentication. The cookie becomes the authentication token that proves authentication to the server after the user has provided their credentials.

A significant security risk is present with this approach. For example, if the cookie is exposed to an eavesdropper, then the eavesdropper may use the cookie on any browser and impersonate or act as the authenticated user. Furthermore, because cookies are generally sent with every request or transaction from the user's browser they have a very high exposure rate to theft from eavesdroppers.

One approach to remove this threat is to always use Secure Socket Layer (SSL) communications for all transactions where the cookie is sent. However, with this technique one improperly configured server can expose the whole system to attack.

Here again, the problems associated with exclusively using SSL communications are known in the industry and there have been many different techniques proposed to fix the problems. One approach is to watch for the Internet Protocol (IP) address of the incoming request or transaction and only allow a cookie to be used if the IP address of the requesting browser is that which was used by the user when the user authenticated into the session initially. But, an intruder can fake the IP address and still hijack the session. The other issue with this approach is that the technique will often fail because the IP address sent with a transaction is really not the IP address of the user's browser but is most likely the IP address of a firewall server or a network address translation (NAT).

Essentially, cookies can be reused by rogue users on different browsers and this poses a substantial security risk to users.

Consequently, there is a need for improved techniques for ensuring secure network communication sessions.

SUMMARY

In various embodiments, techniques for secure network communication are provided. In an embodiment, a method for establishing a secure Internet communication session is presented. Credentials are acquired from a user within a browser in response to a request from a server. The user is attempting to authenticate for purposes of establishing a secure session with a resource over the Internet. Next, a secret that accompanies the credentials is transparently acquired on the client. The credentials and the secret are then securely transmitted to the server for authentication of the user to the resource and to establish the secure session. An initial sequence number is also set on the client. Furthermore, for each transaction during the secure session, the client advances to a unique sequence number. The server will terminate the secure session when for any particular transaction during the secure session, a particular sequence number is repeated and determined by the server to have been previously presented during the secure session.

DETAILED DESCRIPTION

A "resource" includes a user, content, a processing device, a node, a service, an application, a system, a gateway, a directory, a data store, a World-Wide Web (WWW) site, an end-user, groups of users, combinations of these things, etc. The terms "service," "module," "software," and "application" may be used interchangeably herein and refer to a type of software resource that includes instructions, which when executed by a machine performs operations that change the state of the machine and that may produce output.

A "client" or "client workstation" is a machine (computer, processing device, etc.) that a user uses to access a network. The client includes a processing environment and executes a browser, such as a WWW browser. As used herein the terms "client," "desktop," "client machine," "client workstation," and "workstation" may be used interchangeably and synonymously.

A "server" is a machine that the client interacts with over a network, such as the Internet. The user, via its browser on the client, attempts to establish a connection with the server or to a resource of the server.

Various embodiments of this invention can be implemented in existing network architectures, browsers, proxies, agents, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

Figure 1:
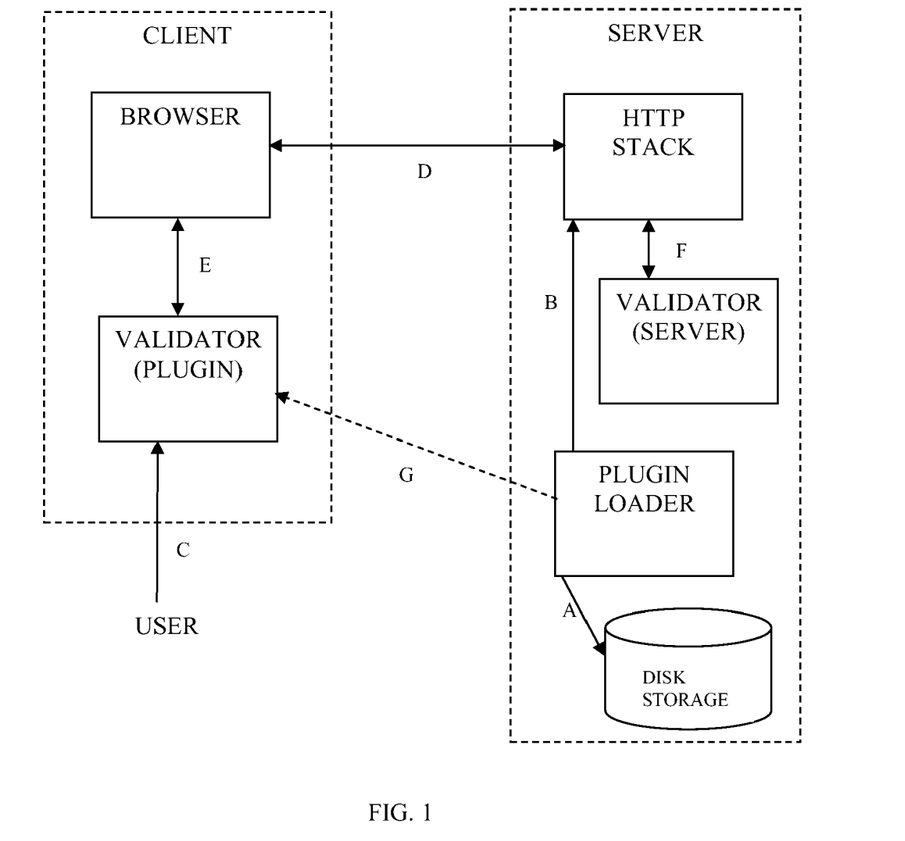
FIG. 1 is a diagram of an example architectural layout and processing flow for secure network communications, according to an example embodiment.

FIG. 1 is a diagram of an example architectural layout and processing flow for secure network communications, according to an example embodiment. The architecture is presented for purposes of illustration and comprehension only as other arrangements can be achieved with the teachings presented herein and below.

Setup

Initially, a custom WWW browser plugin (Validator) is sent to the browser and loaded for execution on a client of a user. This can be achieved via an out-of-band transaction as shown in G or via an in-band transaction as shown via B-D. The plugin is acquired from the server as shown in A and is configured or preconfigured to achieve the processing discussed below on the browser of the client. The validator may be different forms, such as ActiveX, JAVA, etc. and may be customized to the particular platform of the client.

Authentication of User to Server

The user authenticates to the server using the Hypertext Transfer Protocol (HTTP) stack via D. This can be achieved by the server sending a Hypertext Markup Language (HTML) form via the HTTP stack to the browser requesting a password via D.

In this HTML form there is an included object <OBJECT> of type "VALIDATOR" with a "GET SECRET" and a "SET DOMAIN RANGE" request. When the form is received by the browser, a call is made to the validator plugin to generate a secret and set the domain range for the session via E. This secret is placed in a hidden field of the login form and the user is prompted for credentials. When the user enters his/her credentials (id and password) and selects a submit button, the credentials and the secret are sent to the server in the HTML form via a POST/GET data operation shown in D.

The HTTP stack now validates the credentials and if they are correct builds a user session. The session has an ID; this may be a cookie that is then sent to the user's browser, but could be anything known to the stack. If the HTTP stack is Tomcat, an example is a JSESSION cookie. The session ID and the secret are then sent to the validator on the server with a "SET SECRET" command via F. Other information can also be sent, such as time for the session to live, and any other server known data that is to be set by the validator. The HTTP stack now replies to the browser and sets a session ID for this particular user's session. Again, if this is Tomcat, this can be a JSESSION cookie. The server and the client validators both now have a shared secret. At this time the client validator starts with a "SEQUENCE COUNT" of 1 (the sequence count and usage is discussed in detail below).

Access

When the user accesses the server after he/she has authenticated, the browser sends the cookie that was set at authentication time. This cookie is used by the HTTP stack to find the user session. In addition the validator plugin checks the Uniform Resource Locator (URL) information being sent to the server via E. The URL information includes the URL string being sent and the URL header. If the URL is within the domain range that the plugin has a secret for, the plugin builds a canonical string of the URL being requested by the browser and the "SEQUENCE COUNT" of the Validator Plugin. This string is then hashed using CRC, MD5 or any secure hashing algorithm known to both the validator plugin and the server validator. This hash is then encrypted using the "SECRET" known to the validators. The encrypted hash and the non encrypted "SEQUENCE COUNT" are combined to form a new trusted browser cookie called "TRUSTED_BROWSER" and added to the browser's list of cookies to be sent on this request. An example is TRUSTED_BROWSER=34543JK43KK4+SEQ_0001. The "SEQUENCE COUNT" of the validator plugin is then advanced. The request is now sent to the server with the session cookie and the trusted browser cookie via D.

The server receives the HTTP request including the session cookie and the trusted browser cookie via the HTTP Stack. The session cookie (e.g, JSESSION, etc.) is used to establish the session and to identify the user as it would normally do. The "TRUSTED_BROWSER" cookie value, the session identifier, and the requested URL are sent to the validator as a "VALIDATE" command via F.

The validator checks the "SEQUENCE COUNT" part of the trusted browser cookie and validates that this sequence number has not been sent before. If it is a new sequence number, it builds a canonical string of the URL and the "SEQUENCE COUNT" sent to it in the validate command. The string is then hashed with the same algorithm used by the validator plugin on the browser to create a COMPARE VALUE. The TRUSTED BROWSER cookie value is then decrypted with the SECRET known to the server and the client validators. If the result of this decryption matches the COMPARE VALUE, a "VALID" is returned, if not "INVALID" is returned via F.

The HTTP stack can now determine that this request came from the same browser that originated the initial user's authentication. So, this way if any of the cookies are exposed they cannot be used by any other browsers.

Figure 2:
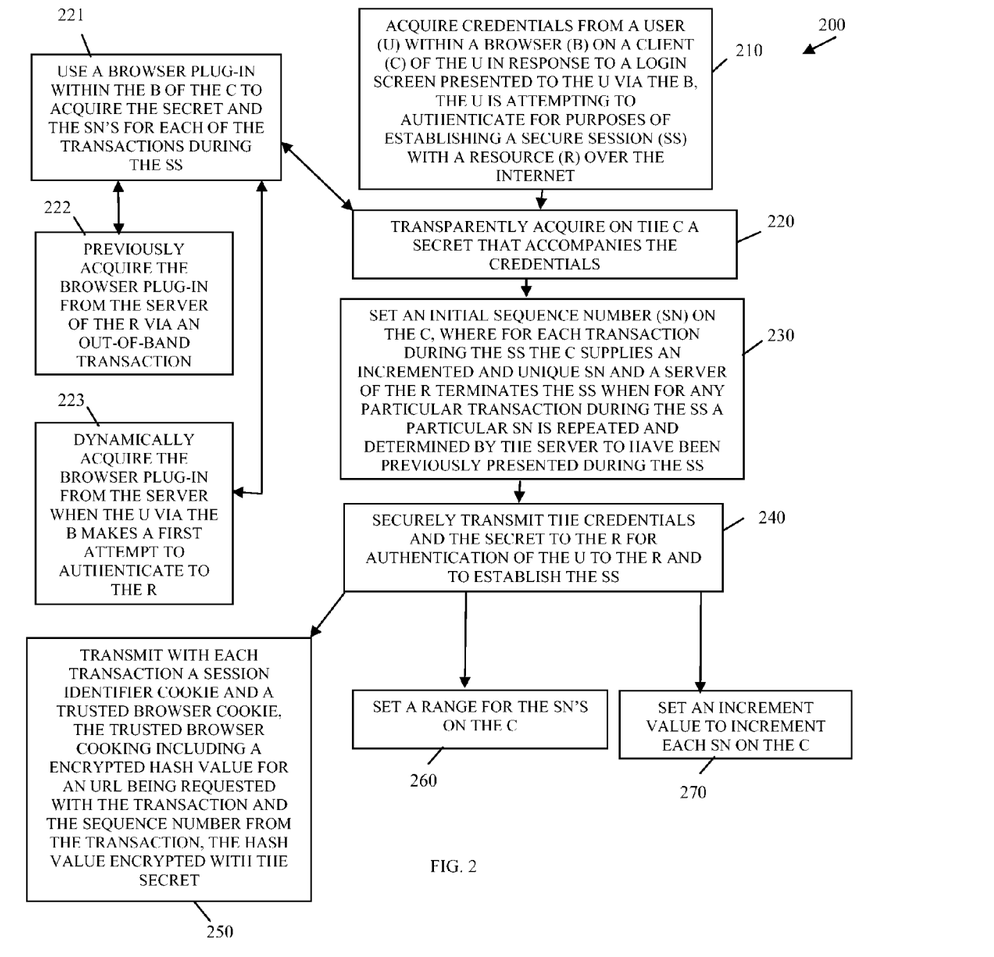
FIG. 2 is a diagram of a method for establishing a secure Internet communication session, according to an example embodiment.

FIG. 2 is a diagram of a method 200 for establishing a secure Internet communication session, according to an example embodiment. The method 200 (herein after referred to as "client-browser service") is implemented in a machine-accessible and computer-readable medium and instructions. The instructions when processed by one or more machines (computer, processing device, etc.) perform the processing depicted in the FIG. 2. The client-browser service is operational over a network and the network is wired, wireless, or a combination of wired and wireless.

At 210, client-browser service acquires credentials from a user. This is done when the user is attempting to access a resource over the Internet using a WWW browser. The server of the resource responds to the access attempt by presenting a request for credentials within the browser. The browser processes on a client device (client computer, client, etc.) and the user is essentially attempting to authenticate to the server for purposes of accessing the resource and establishing a secure session with the user.

In an embodiment, the credentials are a user identifier and password pair. In other cases, the credentials are biometric readings taking from the user via a user biometric input device. In still other situations, the credentials can be a digital certificate, an answer to a question presented in the login screen, etc.

At 220, the client-browser service transparently acquires on the client a secret that accompanies the credentials. By transparent it is meant, the user is completely unaware that the browser (via a plugin—discussed below) has acquired a secret that is going to accompany the user-supplied credentials when the user responds to the login screen within the browser.

Accordingly, in an embodiment, at 221, the client-browser service uses a browser plugin within the client to acquire the secret and unique sequence numbers for each transaction during the secure session (the sequence numbers were discussed above with reference to the FIG. 1 and are also discussed in greater detail herein and below). The browser plugin can be acquired in a variety of manners.

For example, at 222, the client-browser service can have previously acquired the browser plugin from the server of the resource via an out-of-band transaction. So, prior to the processing of the client-browser service the browser plugin may be downloaded and installed on the client and within the browser via a link. Alternatively, the browser plugin may be attached in an email message that when activated installs to the browser. In yet another situation, the browser plugin may be uploaded from computer-readable media to the client and then installed within the browser. This latter embodiment can occur by uploading the browser plugin via a memory stick, memory card, compact disk (CD), digital versatile disk (DVD), etc.

In another example, at 223, the client-browser service dynamically acquires the browser plugin from the server of the resource when the user makes a first attempt to authenticate to the server and the resource. Thereafter, all subsequent attempts to re-authenticate to the server and the resource may not have to re-acquire the browser plugin because it exists on the client and within the browser.

In still another situation, the client-browser service dynamically reacquires a new and session-dependent and session-specific version of the browser plugin each and every time the user attempts to re-authenticate with the server and the resource. In this embodiment, security is enhanced because the browser plugin is specific to a particular user authenticated secure session with the server and the resource.

At 230, the client browser service sets an initial sequence number (this too may be done via the browser plugin discussed with the embodiments referenced at 222 and 223) on the client. Each transaction during the secure session is accompanied by a unique and never before used sequence number. The client (via the browser plugin) supplies a subsequent and unique sequence number for each transaction. Each sequence number is supplied with the request submitted by the user during the secure session in a manner that is transparent to the user.

Next, at 240, the client-browser service securely transmits the credentials, the secret, and the sequence number to the resource for authentication of the user and to initially establish the secure session. In an embodiment, secure communications occur via Secure Socket Layer (SSL) transactions that include automatic encryption and decryption.

Each subsequent transaction request of the user also includes a server provided secure session identifier or key that is pushed back to the client browser when the user successfully authenticates via the credentials and the secret (discussed above with reference to the processing at 210 and 220). So, each transaction request from the user to the resource during the secure session includes a session identifier and a new and unique sequence number.

In an embodiment, at 250, each transaction request also includes a trusted browser cookie that is pushed back to the sever and the resource. The browser cookie is the URL being requested that is hashed and then encrypted with the secret and the sequence number is appended to that. So, the browser cookie includes a hashed value for the URL being requested where that hashed value is encrypted with the common secret and the sequence number is appended thereto. An example of the trusted browser cookies was presented above with reference to the FIG. 1.

If an eavesdropper were to acquire any particular transaction when it is in route over the Internet from the client to the server, the information in that transaction would prove useless. This is so; because the server does not permit any transaction to proceed when a sequence number is presented that was previously used. Thus, once the server and resource process the transaction, the intruder cannot replay it (replay attacks are prevented).

Again, the server of the resource can terminate the secure session when any particular transaction occurring during the secure session includes a particular sequence number that is being repeated. This indicates to the server that the particular sequence number has been previously processed and presented during the secure session and should not be processed again.

A variety of configuration scenarios can be achieved with the sequence numbers.

For example, at 260, the client-browser service can set a valid acceptable range that it expects to see for the presented sequence numbers. This can be achieved via policy shared between the client and the server or it can be established via the browser plugin as preconfigured policy. The policy that sets the valid range can also vary from secure session to secure session. In fact, the policy can be random and a random algorithm that the client and server are to use for a particular secure session (or random initial seed value) can be encrypted in some cases and sent with the secret during initial authentication for that particular secure session. This can further increase security to ensure knowledge about the sequence numbers is not derivable by an intruder.

In still another embodiment, at 270, the client-browser service sets an increment value to increment each sequence number on the client. So, not only can the sequence numbers have a valid range, but they can also have a predefined and configured increment value or even pattern. For example, instead of having a series of sequence numbers beginning with 1 and incrementing by 1, an increment value can be 5 such that the second sequence number is 6 and third is 11, etc. As another example, the sequence increment value can indicate a pattern for incrementing, such as every other even number, prime numbers, etc. Both the client and the server can be preconfigured prior to the session or dynamically configure at the start of the session to use the same increment value.

In other cases, there is no increment value at all; rather, the sequence numbers have a valid range that identifies a set of possible sequence numbers and the client is free to pick any unused sequence number within the set in any order. So, the order of presented sequence numbers can be rendered non-sequential as long as any particular presented sequence number with the set falls with the acceptable set range and has not been previously used.

One now understands how a user can communicate securely with a resource or server over the Internet and the server can assure itself that the same browser the user executed to authenticate to a session is present with each transaction of the session. This creates a trusted browser technique, where the server can trust that any particular transaction of an authenticated session is coming from the same browser that the server initially authenticated for the session.

The processing associated with the client-browser service is presented from the perspective of the client. Conversely, the processing depicted below with the FIG. 3 is presented from the perspective of the server.

Figure 3:
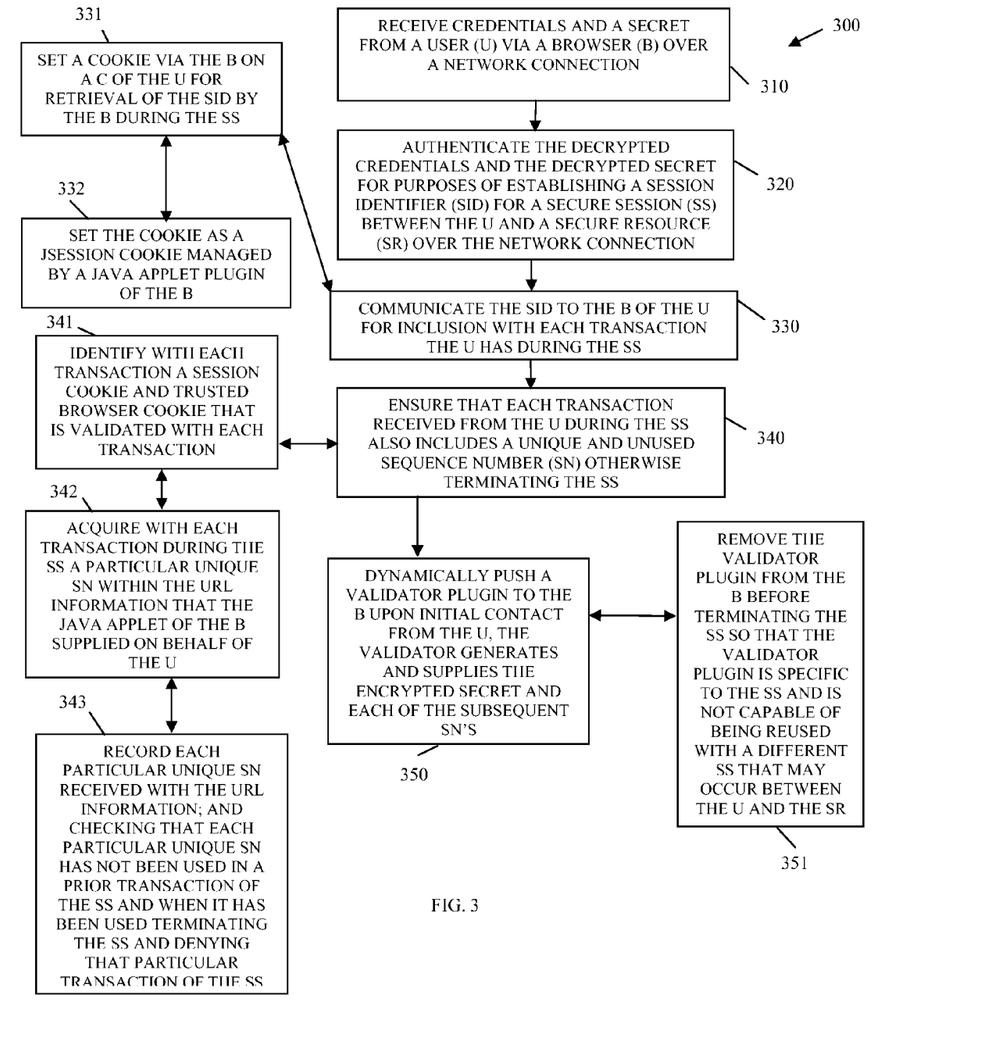
FIG. 3 is a diagram of another method for establishing a secure Internet communication session, according to an example embodiment.

FIG. 3 is a diagram of another method 300 for establishing a secure Internet communication session, according to an example embodiment. The method 300 (herein after referred to as "server validation service") is implemented in a machine-accessible and computer-readable medium and instructions. The instructions when processed by one or more machines (computer, processing device, etc.) perform the processing depicted in the FIG. 3. The server validation service is operational over a network and the network is wired, wireless, or a combination of wired and wireless.

Again, the server validation service presents a processing perspective from the point of view of the server, whereas the client-browser service presents a processing perspective from the point of view of the client.

At 310, the server validation service receives credentials and a secret received from a user via a browser over a network connection, such as the Internet. A technique for acquiring this information was discussed in detail above with reference to the FIGS. 1 and 2 above.

At 320, the server validation service authenticates the credentials and the secret for purposes of establishing a session identifier for a secure session between the user and a secure resource over the network connection. If authentication fails the request and processing terminates and no secure session is established. The remaining processing assumes that the user initially making the authentication request is in fact initially authenticated for purposes of successfully establishing the secure session and the session identifier.

At 330, the server validation service communicates the session identifier (session key) to the browser of the user for inclusion with each transaction that the user has during the secure session with the secure resource.

In an embodiment, at 331, the server validation service sets a cookie on the browser of client for the user that includes the session identifier. A browser plugin retrieves the session identifier from the cookie with each transaction of the session and appends the session identifier to each session transaction (as discussed above with reference to the FIGS. 1 and 2).

In one case, at 332, the server validation service sets the cookie as a JSESSION cookie managed by a JAVA applet plugin of the browser.

At 340, the server validation service ensures that each transaction received from the user during the secure session also includes a unique and unused sequence number and if it does not the server validation service terminates the secure session.

In an embodiment, at 341, the server validation service identifies with each transaction the session identifier and a trusted browser generated cookie. The trusted browser generated cookie is an encrypted version of a URL being requested with that particular transaction and the sequence number appended to the encrypted version of the URL. In response to this browser cookie, the server validation service uses a same hash algorithm that the browser used and hashes the URL being requested to a hash value. The encrypted version of the URL supplied with the browser cookie is then decrypted with the secret and the server validation service generated hash value is compared against the decrypted hash value, if a match occurs and if the appended sequence number is new and not previously used, then the server validation service permits the transaction to continue and trust that it is secure and valid.

According to an embodiment, at 342, the server validation service acquires with each transaction of the secure session a particular unique sequence number within URL information that the JAVA applet (from the embodiment at 332) of the browser supplied on behalf of the user. So, the type, range of acceptable values, and increment values (if at all) for the sequence numbers are configured in the JAVA applet and also known to the server validation service. Again, this can be achieved via policy negotiated and communicated during initial authentication or can be pre-configured or even configured dynamically via a processing parameter that sets these things in both the JAVA applet and the server validation service.

In some cases, at 343, the server validation service records each particular unique sequence number received with the URL information. Each sequence number received is then checked to ensure that it has not been used in a prior transaction of the secure session. When a particular sequence number has been presented and used before, the server validation service terminates the secure session and denies the particular transaction associated with the bad sequence number from processing against the resource and during the secure session. Sometimes, policy may allow for the server validation service to just deny the offending transaction and not actually terminate the secure session.

According to an embodiment, at 350, the server validation service dynamically pushes a validator plugin (such as the JAVA applet discussed with the embodiment at 332) to the browser upon initial contact from the user. The validator plugin generates and supplies the encrypted secret and each of the subsequent sequence numbers. This also allows the server validation service to configure the validator plugin for a valid range and increment value (if at all) associated with the sequence numbers.

In some cases, at 351, the server validation service removes or causes to be removed the validator plugin from the browser before terminating the secure session so that the validator plugin is specific to the secure session and is not capable of being reused with a different secure session that may occur between the user and the secure resource. This was discussed above with reference to the method 100 above.

Figure 4:
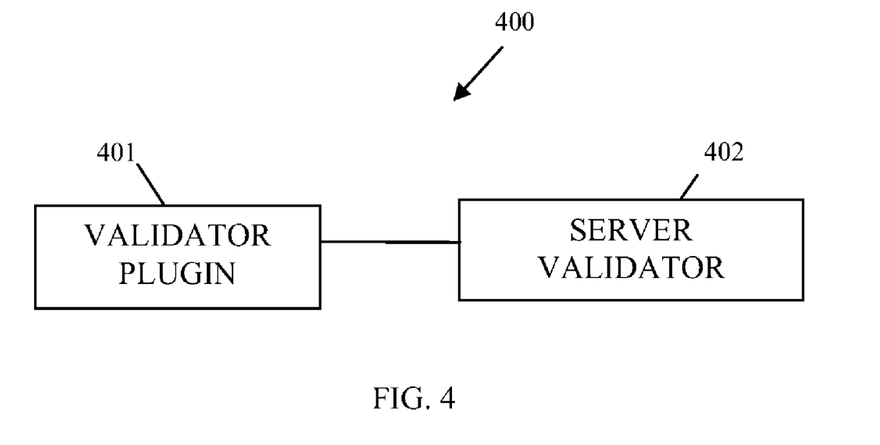
FIG. 4 is a diagram of a secure network communication system, according to an example embodiment.

FIG. 4 is a diagram of a secure network communication system 400, according to an example embodiment. The secure network communication system 400 is implemented as instructions on or within a machine-accessible and computer-readable medium. The instructions when executed by machines of a network perform, among other things, processing depicted with respect to the methods 200 and 300 of the FIGS. 2 and 3, respective. The secure network communication system 400 is also operational over a network, and the network is wired, wireless, or a combination of wired and wireless.

The secure network communication system 400 includes a validator plugin 401 and a server validator 402. Each of these and their interactions with one another will now be discussed in turn.

The validator plugin 401 is implemented in a machine-accessible and computer-readable medium and is to process on a client of a user and within a WWW browser that also processes on the client. Example processing associated with the validator plugin 401 was provided above with reference to the method 200 of the FIG. 2.

The validator plugin 401 supplies a secret for initial user authentication to a resource controlled via a server. Furthermore, the validator plugin 401 supplies a unique sequence number for each transaction that the user makes via the WWW browser to interact with the resource, which is controlled by the server during a secure session between the user and the resource over the network.

The server validator 402 is implemented in a machine-accessible and computer-readable medium and is to process on a server of the network. Example processing associated with the server validator 402 was presented in detail above with reference to the method 300 of the FIG. 3.

The server validator 402 acquires the secret on initial authentication and also ensures that before any particular transaction can proceed during the secure session that a new and unused sequence number that is supplied from the validator plugin 401.

In an embodiment, the validator plugin 401 is delivered and installed in the WWW browser of the client before the user ever attempts to authenticate to the resource via an out-of-band transaction.

In another embodiment, the validator plugin 401 is dynamically delivered in real time to and installed on the WWW browser by the server over the network connection. This occurs when the user makes a first and initial attempt to authenticate with the resource to create a first and initial attempt to authenticate with the resource for purposes of creating a first and initial secure session with the resource. The validator plugin 401 remains available on the client for use to supply different secrets and sequence numbers for subsequent attempts by the user to establish other secure sessions with the resource.

In a particular case, a different and unique instance of the validator plugin 401 is dynamically delivered in real time to and installed on the WWW browser by the server over the network connection each time the user attempts to create a different secure session with the resource. Each instance of the validator plugin is removed from the WWW browser when its particular secure session terminates.

According to an embodiment, the validator plugin 401 and the server validator 402 each use a same hashing algorithm and the secret. Each URL being requested during a particular transaction is hashed by the validator plugin 401 within the browser and then encrypted with the secret; the encrypted hash value has the unique sequence number for the transaction appended thereto to make a trusted browser cookie that is sent with each transaction back to the server validator 402. The server validator 402 then generates its own hash value for the URL being requested and then decrypts the encrypted hash value supplied in the browser cookie and compares the two with one another. If the two are the same and if the appended sequence number is unused, the server validator 402 validates the transaction and permits it to proceed as having originated from a trusted browser. Each transaction can also include the session identifier also retained in a cookie and appended to each transaction by the validator plugin 401.

In still another situation, the validator plugin 401 and the server validator 402 are each configured to set a valid range for the sequence numbers and an increment value associated with incremented a previously used sequence number to a next available sequence number.

Figure 5:
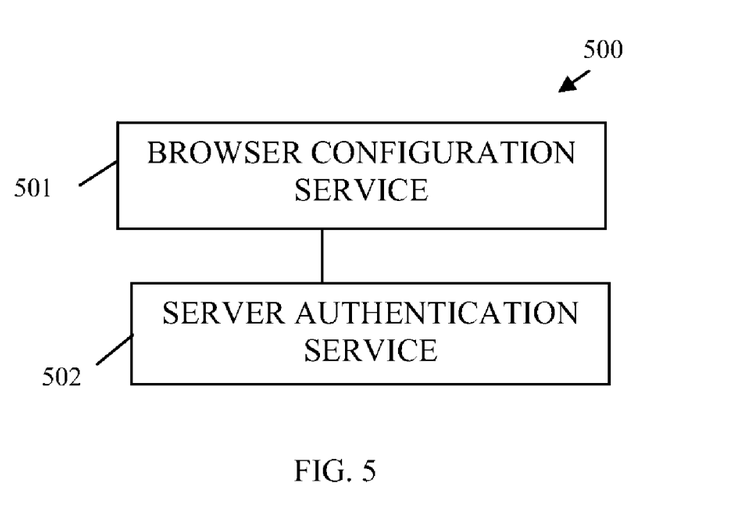
FIG. 5 is a diagram of another secure network communication system, according to an example embodiment.

FIG. 5 is a diagram of another secure network communication system 500, according to an example embodiment. The secure network communication system 500 is implemented as instructions on or within a machine-accessible and computer-readable medium. The instructions when executed by machines of a network perform, among other things, processing depicted with respect to the method 300 of the FIG. 3. The secure network communication system 500 is also operational over a network, and the network is wired, wireless, or a combination of wired and wireless. The secure network communication system 500 presents another and in some cases enhanced perspective of the secure network communication system 400 represented by the FIG. 4.

The secure network communication system 500 includes a browser configuration service 501 and a server authentication service 502. Each of these and their interactions with one another will now be discussed in turn.

The browser configuration service 501 is implemented in a machine-accessible and computer-readable medium and processes on a server machine of the network.

The browser configuration service 501 configures a browser plugin for installation and execution a client machine of a user to coordinate a secret between the user and a resource for use when the user attempts to authenticate to the server authentication service 502 for purposes of establishing a session with the resource over a network, such as the Internet. Furthermore, the browser configuration service 501 configures the browser plugin to supply unique sequence numbers with each transaction of the session back to the server authentication service 502.

In an embodiment, the browser configuration service 501 configures the browser plugin to increment the sequence numbers by random amounts.

According to an embodiment, the browser configuration service 501 configures the browser plugin to generate a hash value for each URL being requested with a particular transaction and then encrypt that hash value with the secret and append to the encrypted hash value a particular unique sequence number, the encrypted hash value and the sequence number form a trusted browser cookie that the server authentication service 502 independently validates with each transaction before permitting any particular transaction to proceed.

The server authentication service 502 is implemented in a machine-accessible and computer-readable medium and processes on the server machine of the network.

The server authentication service 502 authenticates credentials of a user and acquires the secret during initial authentication and establishment of the session. In response, the server authentication service 502 pushes a session identifier to the client that is supplied back with each transaction of the session and serves as validation for each subsequent transaction. Additionally, for each transaction after authentication the server authentication service 502 validates that a supplied sequence number that accompanies each transaction is being presented for a first time and is unused. When it is not being presented for a first time, the server authentication service 502 can terminate the session and deny that particular transaction or just deny that particular transaction (depending upon policy).

In some cases as discussed above, the server authentication service 502 may also receive with each transaction a trusted browser cookie. That cookie includes an encrypted hash value for the URL being requested with the transaction. The server authentication service 502 uses a hashing algorithm that the browser configuration service 501 used to produce its own independent hash value for the URL being requested. Next, the encrypted hash value is decrypted using the common secret and the decrypted hash value is compared against the server authentication service 502 generated hash value. When there is a match and when the sequence number that is appended is not used, then the server authentication service 502 can be assured that the transaction is legitimate and originated from a trusted browser.

It is now appreciated how secure browsing can be achieved, such that a resource or server can trust that each transaction of a session is coming from a browser that was initially used by a user to authenticate to the resource or server. This is a substantial improvement over what has been achieved to date.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   receiving credentials and a secret from a user via a browser over a network connection;
   authenticating the credentials and the secret for purposes of establishing a session identifier for a secure session between the user and a secure resource over the network connection;
   communicating the session identifier to the browser of the user for inclusion with each transaction the user has during the secure session, the secure session having a plurality of transactions; and
   generating by a client of the user and ensuring that each transaction received from the user during the secure session also includes a unique and never before used during the secure session sequence number supplied by the client of the user, the client incrementing the sequence number for each transaction of the secure session, and when any particular transaction of said secure session has said unique and never before used sequence number continuing the secure session and handling the transaction without requiring re-authentication of the user, and when the transaction does not have the unique and unused sequence number terminating the secure session.

2. The method of claim 1 further comprising, dynamically pushing a validator plugin to the browser upon initial contact from the user, wherein the validator plugin generates and supplies the secret and each of the subsequent sequence numbers.

3. The method of claim 2 further comprising, removing the validator plugin from the browser before terminating the secure session so that the validator plugin is specific to the secure session and is not capable of being reused with a different secure session that may occur between the user and the resource.

4. The method of claim 1, wherein communicating further includes setting a cookie via the browser on a client of the user for retrieval of the session identifier by the browser during the secure session.

5. The method of claim 4, wherein setting further includes setting the cookie as a JSESSION cookie managed by a JAVA applet plugin of the browser.

6. The method of claim 5, wherein ensuring further includes acquiring with each transaction during the secure session said particular unique sequence number within Uniform Resource Locator (URL) information that the JAVA applet of the browser supplied on behalf of the user.

7. The method of claim 1 further comprising:
   incrementing randomly a unique sequence number used in a prior transaction of the secure session to create the unique sequence number.

8. A machine-implemented system, comprising:
   a client with memory having executable instructions for a validator plugin that processes on the client of a user and within a World-Wide Web (WWW) browser that also processes on the client; and
   a server with memory having executable instructions for a server validator that processes on the server of a network;
   wherein the validator plugin supplies a secret for initial user authentication to a resource controlled by the server and the validator plugin supplies a unique sequence number for each transaction of a plurality of transactions of a secure session that the user makes via the WWW browser to interact with the resource controlled by the server during the secure session between the user and the resource over the network, each unique sequence number is never before used during any previous transaction of the secure session and is presented for a particular current transaction during the secure session, and wherein the server validator acquires the secret upon user authentication and ensures that before any particular transaction can proceed during the secure session that a new and unused sequence number is supplied from the validator plugin.

9. The system of claim 8, wherein the validator plugin is delivered and installed in the WWW browser before the user attempts to authenticate to the resource via an out-of-band network transaction.

10. The system of claim 8, wherein the validator plugin is dynamically delivered in real time to and installed on the WWW browser by the server and over the network connection when the user makes a first and initial attempt to authenticate with the resource to create a first and initial secure session, and wherein the validator plugin remains available on the client for use to supply different secrets and sequence numbers for subsequent attempts by the user to establish other secure sessions with the resource.

11. The system of claim 10, wherein a different and unique instance of the validator plugin is dynamically delivered in real time to and installed on the WWW browser by the server and over the network connection each time the user attempts to create a different secure session with the resource, and wherein each instance of the validator plugin is removed from the WWW browser when its particular secure session terminates.

12. The system of claim 8, wherein the validator plugin and the server validator each use a same hashing algorithm to hash each Uniform Resource Locator link (URL) requested with each transaction into a particular hash value, each hash value encrypted with the secret and each encrypted hash value along with a particular unique sequence number supplied by the validator plugin with each transaction as a trusted browser cookie that the server validator independently verifies for each transaction during the secure session.

13. The system of claim 8, wherein the validator plugin and the server validator are each configured to set a valid range for the sequence numbers and an increment value associated with incrementing a previously used sequence number to a next available sequence number.

14. A machine-implemented system, comprising:
a server machine having executable instructions for a browser configuration service that processes on the server machine of a network; and
the server machine also having executable instructions for a server authentication service that processes on the server machine of the network;
wherein the browser configuration service configures a browser plugin for installation and execution on a client machine of a user to supply and coordinate a secret between the user and a resource for use when the user attempts to authenticate to the server authentication service to establish a session with the resource over the network, said session comprising a plurality of transactions, and wherein the browser configuration service configures the browser plugin to supply a unique sequence number with each transaction of the session to the server authentication service, the unique sequence number was never before used during any previous transaction of the session and is presented for a particular transaction of the session, and wherein for each transaction attempted by the user during the session the server authentication service validates that a supplied sequence number is being presented for a first time and is unused, and when the sequence number being presented for the transaction is presented for the first time and is unused, the session is permitted to continue without requiring further authentication of the user, otherwise the server authentication service terminates the session.

15. The system of claim 14, wherein the server authentication service supplies a session identifier for the session to the browser of the client machine for use with transactions of the session.

16. The system of claim 14, wherein the browser configuration service configures the browser plugin to increment the sequence numbers by a random amount for each transaction.

17. The system of claim 14, wherein the browser configuration service configures the browser plugin to supply a trusted browser cookie with each transaction, the trusted browser cookie includes an encrypted hash value, the hash value produced by hashing a Uniform Resource Locator (URL) link that is encrypted with the secret, and wherein the trusted browser cookie also has appended thereto the unique sequence number for the transaction that it is associated with.

* * * * *